(12) United States Patent
Lim (10) Patent No.: US 7,484,047 B2
(45) Date of Patent: Jan. 27, 2009

(54) APPARATUS AND METHOD FOR COMPOSING A CACHE MEMORY OF A WIRELESS TERMINAL HAVING A COPROCESSOR

(75) Inventor: Chae-Whan Lim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 259 days.

(21) Appl. No.: 10/917,491

(22) Filed: Aug. 13, 2004

(65) Prior Publication Data
US 2005/0038962 A1    Feb. 17, 2005

(30) Foreign Application Priority Data
Aug. 16, 2003   (KR)   ............... 10-2003-0056666

(51) Int. Cl.
G06F 12/00 (2006.01)
G06F 13/00 (2006.01)
G06F 13/28 (2006.01)
(52) U.S. Cl. .............. 711/148; 711/103; 711/118; 711/129; 711/130; 711/147; 711/170; 711/173
(58) Field of Classification Search ............ 711/101, 711/117, 120, 121, 103, 148
See application file for complete search history.

(56) References Cited

U.S. PATENT DOCUMENTS 4,959,860 A * 9/1990 Watters et al. ............... 726/19

(Continued)

OTHER PUBLICATIONS

Jim Handy, The Cache Memory Book, copyright 1998, 1993, Academic Press, Inc., second edition, pp. 12, 44 & 45.*

Primary Examiner—Kevin L Ellis
Assistant Examiner—Prasith Thammavong
(74) Attorney, Agent, or Firm—Roylance, Abrams, Berdo & Goodman, L.L.P.

(57) ABSTRACT

A terminal apparatus and method for controlling access by a processor and coprocessor to data buses that connect memories. The apparatus and method comprise a first flash memory connected to a second data bus and having a first area for storing operation programs of the main processor and a second area for storing operation programs of the coprocessor; a second flash memory connected to the second data bus and having a first area for storing data requiring non-volatility of the main processor, and a second area for storing data requiring non-volatility of the coprocessor; a random access memory connected to the second data bus and having a first area and a second area, the first area temporarily storing data occurring during an operation of the main processor and allowing a portion of a code which is executed in a random access memory area to be loaded in the first area, and the second area temporarily storing data occurring during an operation of the coprocessor and allowing a portion of the code which is executed in the random access memory area to be loaded in the second area; a cache memory connected between a first data bus and the second data bus for caching the data and the codes of the first areas of the random access memory and the flash memories; and a cache controller connected to the first data bus, for determining whether or not a cache hit or a cache miss occurs in the cache memory, controlling the main processor to access the cached data or codes when the cache hit occurs in the cache memory, and accessing the memories to store the data or the codes in the cache memory and simultaneously controlling the main processor to access when the cache miss occurs in the cache memory.

10 Claims, 3 Drawing Sheets

U.S. PATENT DOCUMENTS

| | | | |
|---|---|---|---|
| 5,430,859 A * | 7/1995 | Norman et al. | 711/103 |
| 5,822,251 A * | 10/1998 | Bruce et al. | 365/185.33 |
| 5,893,143 A * | 4/1999 | Tanaka et al. | 711/120 |
| 5,893,163 A * | 4/1999 | Arimilli et al. | 711/153 |
| 5,903,908 A * | 5/1999 | Singh et al. | 711/122 |
| 6,360,303 B1 * | 3/2002 | Wisler et al. | 711/152 |
| 6,397,295 B1 * | 5/2002 | Shagam | 711/121 |
| 6,649,473 B1 * | 11/2003 | Lin et al. | 438/257 |
| 6,744,692 B2 * | 6/2004 | Shiota et al. | 365/230.03 |
| 7,203,829 B2 * | 4/2007 | Lim | 713/2 |
| 2004/0255111 A1 * | 12/2004 | Lim | 713/2 |

* cited by examiner

APPARATUS AND METHOD FOR COMPOSING A CACHE MEMORY OF A WIRELESS TERMINAL HAVING A COPROCESSOR

PRIORITY

This application claims the benefit under 35 U.S.C. § 119 (a) of an application entitled "Apparatus and method for composing cache memory of wireless terminal having coprocessor" filed in the Korean Intellectual Property Office on Aug. 16, 2003 and assigned Serial No. 2003-56666, the entire contents of which are incorporated herein by reference.

BACKGROUND OF THE INVENTION

1. Field of the Invention

The present invention relates to an apparatus and a method for composing a cache memory of a wireless terminal having a coprocessor. More particularly, the present invention relates to an apparatus and a method capable of reducing the number of additional memory devices in a wireless terminal by enabling a coprocessor to have a cache function.

2. Description of the Related Art

In a system having a main processor and a coprocessor, the main processor controls the general operation of the system and the coprocessor controls a specific function under the control of the main processor. Such a structure is currently being employed in wireless terminals performing complex functions. For example, in a wireless terminal processing an image signal, the main processor of the wireless terminal controls the communication and the general operation of the wireless terminal and the coprocessor thereof processes signals for performing a specific function under the control of the main processor. A wireless terminal having a coprocessor as described above may include a wireless terminal having a camera, a Personal Digital Assistant (PDA), or a wireless terminal providing a Video On Demand (VOD) function.

A system having a main processor and a coprocessor as described above may have a structure as shown in FIG. 1. Hereinafter, a description will be given on an assumption that the system is a wireless terminal and the coprocessor is a multimedia coprocessor for exclusively processing an image signal.

Figure 1:
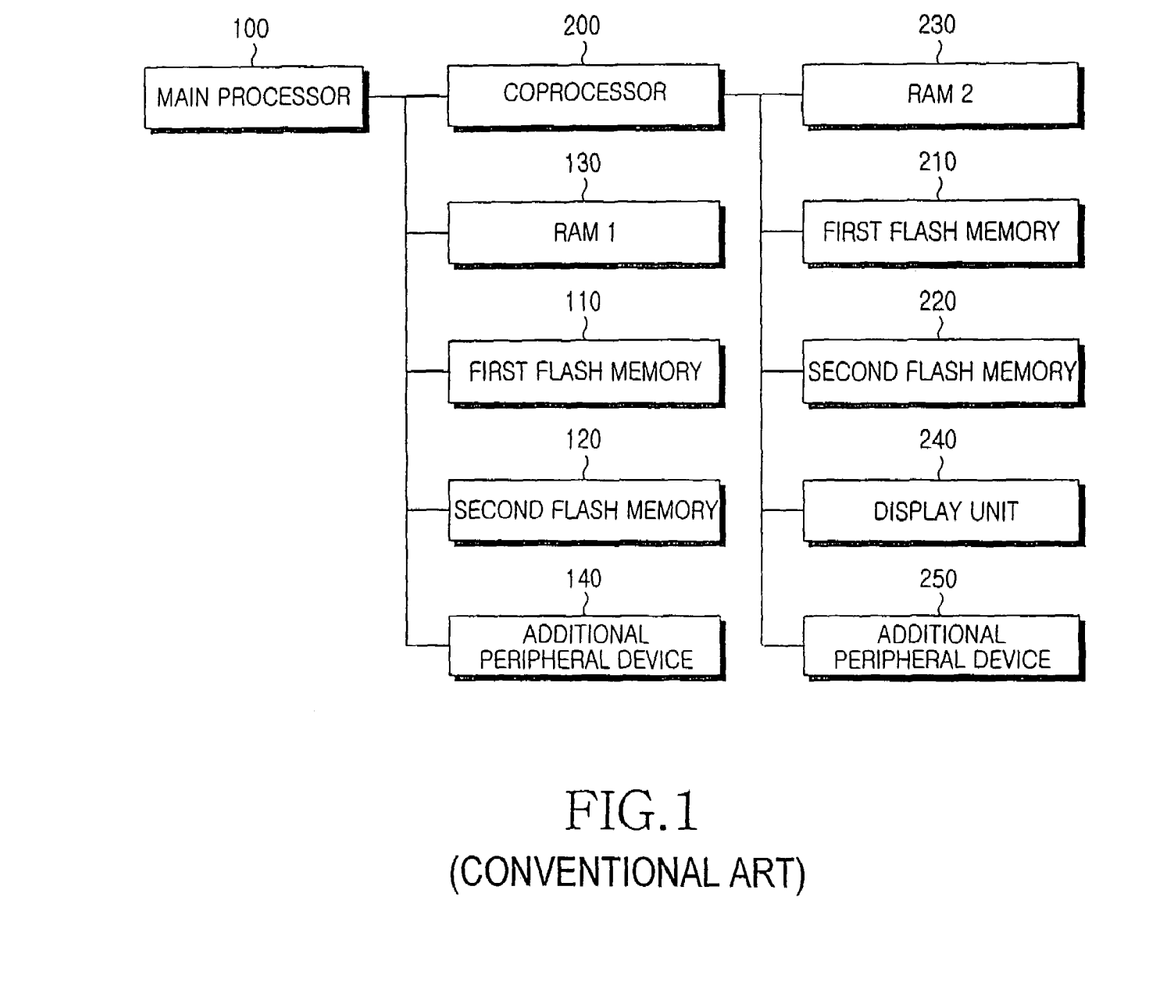
FIG. 1 is a block diagram illustrating a construction of a conventional wireless terminal having a coprocessor.

Referring to FIG. 1, a main processor 100 controls the communication and the general operation of the wireless terminal. A first flash memory 110 stores a boot and loader program, main operation programs, and a flash file system of the main processor 100. A second flash memory 120 is a non-volatile memory (NVM) for storing data, such as contents data, font data, bit map data, or phonebook data, which requires a permanent storage. A random access memory (hereinafter, referred to as a RAM) 130 may be used as a work memory of the main processor 100. An additional peripheral device 140 represents devices operating under the control of the main processor 100. Herein, the additional peripheral device 140 may include a keypad, a display unit, a wireless communication unit, a communication unit, and the like.

A coprocessor 200 exclusively processes a specific function under the control of the main processor 100. Herein, it is assumed that the coprocessor 200 processes multimedia data. A first flash memory 210 stores a boot and loader program, main operation programs, and a flash file system of the coprocessor 200. A second flash memory 220 stores data (such as, contents data), which require a non-volatility, according to the function of the coprocessor 200. A RAM 230 may be used as a work memory of the coprocessor 200. When the coprocessor 200 is a processor exclusively performing an image processing, a display unit 240 displays an image signal processed under the control of the coprocessor 200. Herein, when only one display unit 240 exists in the wireless terminal, the display unit 240 may become a peripheral device accessed by the main processor 100 and the coprocessor 200. An additional peripheral device 250 represents devices operating under the control of the coprocessor 200. Herein, when the wireless terminal is a camcorder, the additional peripheral device 250 may include a MultiMedia Card (MMC) I/F module, a camera, etc. Further, contents data stored in the second flash memory 220 may become image-processed data. Also, when the wireless terminal is a PDA terminal, the additional peripheral device 250 may include all applications except for a communication function.

As described above, the coprocessor 200 represents a processor capable of executing functions or application programs requiring high speed in the system, such as a graphic user interface (GUI), a multimedia codec, and so on. Further, the main processor 100 represents a processor controlling the general operation of the system. For instance, in the case of a wireless terminal, the main processor 100 may become a modem chip such as an Mobile Station Modem (MSM). Each of the boot modules stored in the first flash memories 110 and 210 represents a software module which initializes an operation of a corresponding processor and can actually shift into a main software routine. Further, the loader module represents a software module for moving the remaining main software code portions to a memory area which can be controlled by a controller, when only some necessary modules other than the remaining main software code portions are initialized and operated after booting. The bootloader module represents a software module in which the boot module is combined with the loader module. The flash file system represents a software module which enables data to be stored in the flash memory without an error or be read from the flash memory without an error.

In FIG. 1, the first flash memories 110 and 210 may become NOR-type flash memories and the second flash memories 120 and 220 may become NAND-type flash memories. Herein, the NOR flash memory has a stable structure, but it is expensive. Further, the NOR flash memory stores a boot and loader program, and flash file systems. The NAND flash memory is lower priced than the NOR flash memory and can have a high capacity, but it has a greater probability of having a bad sector occurring in the memory. Further, the NAND flash memory mainly stores contents data of a corresponding device. If the NAND flash memory stores the boot and loader program, and the flash file systems, when the bad sector occurs in an area in which the program is stored, an operation of the system cannot be performed. Accordingly, the NOR-type flash memory is generally used as a memory for storing a program and the NAND-type flash memory is generally used as a memory for storing data (such as, contents data, font data, bit map data, phonebook data, and image data), which must not be erased.

As described above, the main processor 100 and the coprocessor 200 each have memories, each of which includes a NOR flash memory, a NAND flash memory, and a RAM. Accordingly, since the main processor 100 and the coprocessor 200 must have such memories respectively, a package space for hardware increases and the cost of the product increases. That is, as shown in FIG. 1, the main processor 100 and the coprocessor 200 each have structures in which the first flash memories, the second flash memories, and the RAMs are independently contained. Since the main processor 100 and the coprocessor 200 must include many memories respectively, many problems occur in achieving miniaturization, low power, and low cost of the terminal.

Accordingly, when the main processor 100 and the coprocessor 200 share the first flash memories, the second flash memories, and the RAMs and the main processor 100 and the coprocessor 200 respectively and independently access the memories when necessary, the number of the memories can be reduced by half.

SUMMARY OF THE INVENTION

Accordingly, the present invention has been made to solve the above-mentioned problems occurring in the prior art, and it is an object of the present invention to provide an apparatus and a method, which allow each processor to share memories in a wireless terminal having a main processor and a coprocessor.

It is another object of the present invention to provide an apparatus and a method, in which a main processor and a coprocessor in a wireless terminal share memories and access of the main processor and the coprocessor to the memories can be controlled by means of a cache memory.

It is further another object of the present invention to provide an apparatus and a method, in which a cache controller controls a cache memory in a wireless terminal having a main processor and a coprocessor, thereby controlling access to memories, so that the main processor and the coprocessor can share the memories.

It is still another object of the present invention to provide an apparatus and a method, in which a cache controller controls a first cache memory connected to a main processor and a second cache memory connected to a coprocessor in a wireless terminal, so that the main processor and the coprocessor can share memories.

In order to accomplish the aforementioned object, according to one aspect of the present invention, there is provided a terminal apparatus including a main processor and a coprocessor, the main processor is connected to a first data bus to control a telephone function of a wireless terminal, and the coprocessor connected between the first data bus and a second data bus for performing a multimedia function of the wireless terminal under a control of the main processor. The terminal apparatus comprises a first flash memory connected to the second data bus and having a first area for storing operation programs of the main processor and a second area for storing operation programs of the coprocessor; a second flash memory connected to the second data bus and having a first area for storing data requiring non-volatility of the main processor, and a second area for storing data requiring non-volatility of the coprocessor; a random access memory connected to the second data bus and having a first area and a second area, the first area temporarily storing data occurring during an operation of the main processor and allowing a portion of a code which is executed in a random access memory area to be loaded in the first area, and the second area temporarily storing data occurring during an operation of the coprocessor and allowing a portion of the code which is executed in the random access memory area to be loaded in the second area; a cache memory connected between the first data bus and the second data bus for caching the data and the codes of the first areas of the random access memory and the flash memories; and a cache controller connected to the first data bus, for determining whether or not a cache hit or a cache miss occurs in the cache memory, controlling the main processor to access the cached data or codes when the cache hit occurs in the cache memory, and accessing the memories to store the data or the codes in the cache memory and simultaneously controlling the main processor to access when the cache miss occurs in the cache memory.

In order to accomplish the aforementioned object, according to one aspect of the present invention, there is provided a terminal apparatus including a main processor and a coprocessor, the main processor is connected to a first data bus to control a telephone function of a wireless terminal, and the coprocessor is connected between the first data bus and a second data bus to perform a multimedia function of the wireless terminal under a control of the main processor. The terminal apparatus comprises a first flash memory connected to the second data bus and having a first area for storing operation programs of the main processor and a second area for storing operation programs of the coprocessor; a second flash memory connected to the second data bus and having a first area for storing data of the main processor, which require non-volatility, and a second area for storing data of the coprocessor, which require non-volatility; a random access memory connected to the first data bus and having a first area and a second area, the first area for temporarily storing data occurring during an operation of the main processor and allowing a portion of a code which is executed in a random access memory area to be loaded in the first area, and the second area for temporarily storing data occurring during an operation of the coprocessor and allowing a portion of the code which is executed in the random access memory area to be loaded in the second area; a first cache memory connected between the first data bus and the second data bus for caching the data and the codes of the first areas of the flash memories and the random access memory; a second cache memory connected to the second data bus for caching the data and the codes of the second areas of the flash memories and the random access memory; and a cache controller connected to the first data bus, for determining whether or not a cache hit or a cache miss occurs in the first or the second cache memory, controlling the main processor to access the cached data or codes when the cache hit occurs in the first cache memory, controlling the coprocessor to access the cached data or codes when the cache miss occurs in the first cache memory and the cache hit occurs in the second cache memory, accessing the memories for controlling the data or the codes to be stored in the cache memory when the cache miss occurs, and accessing the memories for controlling the data or the codes to be stored in the first or the second cache memory when the cache miss occurs in the first and the second cache memory.

BRIEF DESCRIPTION OF THE DRAWINGS

The above and other objects, features and advantages of the present invention will be more apparent from the following detailed description taken in conjunction with the accompanying drawings, in which.

Throughout the drawings, it should be noted that the same or similar elements are denoted by like reference numerals.

DETAILED DESCRIPTION OF THE EXEMPLARY EMBODIMENTS

Exemplary embodiments of the present invention will now be described with reference to the accompanying drawings.

In the following description of the present invention, a detailed description of known functions and configurations incorporated herein will be omitted for conciseness.

Hereinafter, a description is given on an assumption that a system having a main processor and a coprocessor is a wireless terminal (portable phone) and the coprocessor is a processor for processing multimedia data. However, an embodiment of the present invention can be applied to other systems as well as the wireless terminal, and the coprocessor can be used as a processor for processing other functions as well as multimedia information.

Figure 2:
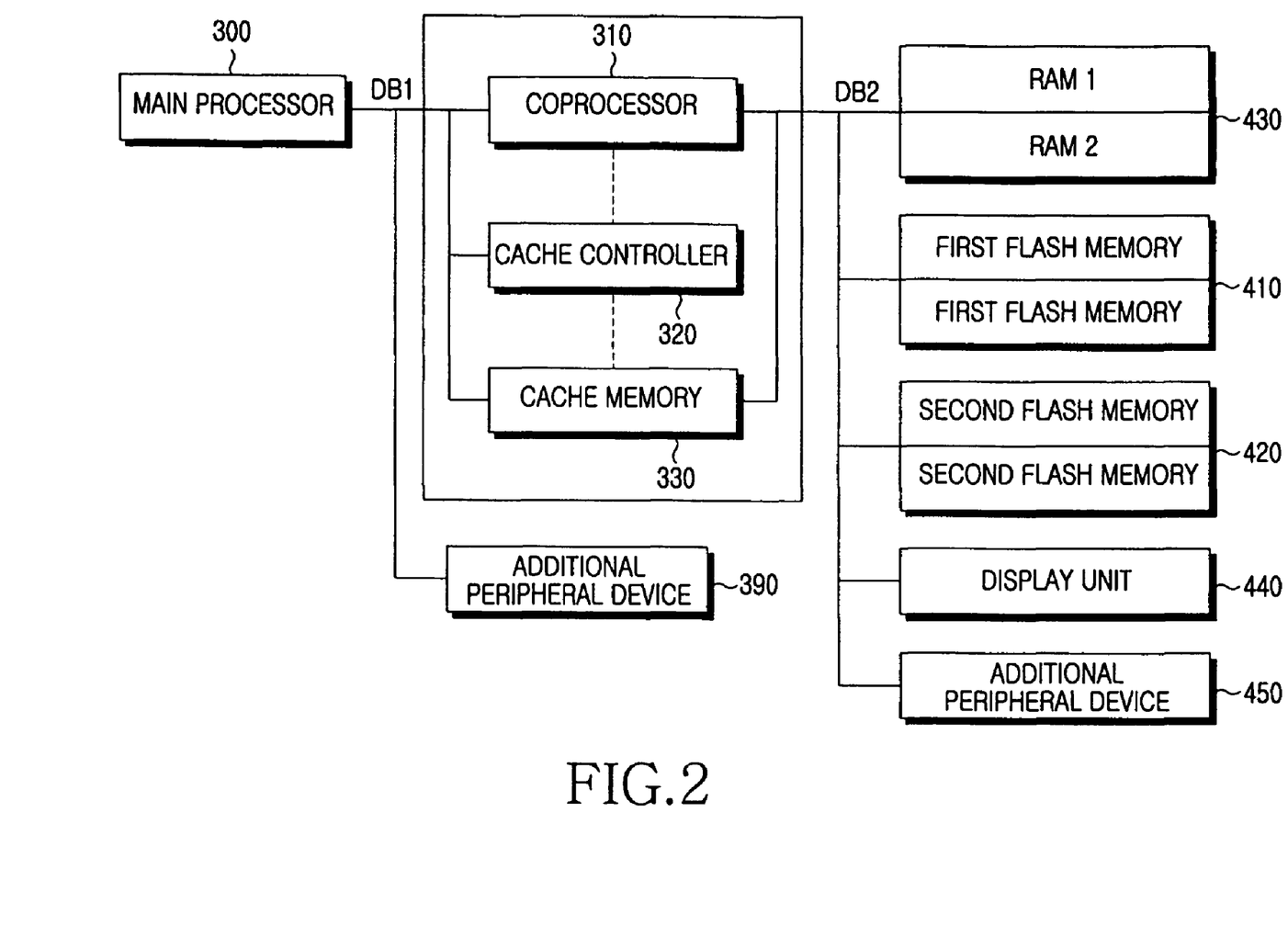
FIG. 2 is a block diagram illustrating a construction of a wireless terminal having a coprocessor according to a first embodiment of the present invention.

FIG. 2 is a block diagram illustrating a construction of a wireless terminal having a coprocessor according to a first embodiment of the present invention.

Referring to FIG. 2, a main processor 300 is connected to a first data bus DB1 and controls the communication and the general operation of the wireless terminal. The coprocessor 310 and a peripheral device 390 for performing a communication function in the wireless terminal are connected to the first data bus DB1. Herein, the main processor 300 may be a Mobile Station Modem (MSM). The coprocessor 310 is connected between the first data bus DB1 and a second data bus DB2 and exclusively processes a specific function under the control of the main processor 300. Herein, the specific function may be a multimedia data processing function and the multimedia data may be image data photographed by a camera, image data received in a TV receiver, an MP3 audio data, and so on.

A cache memory 330 is connected between the first data bus DB1 and the second data bus DB2 and caches both data and a code of the main processor 300 stored in various memories. A cache controller 320 is connected to the first data bus DB1 via DB2 and checks whether or not a cache hit/miss occurs in the cache memory 330. Further, when the cache hit occurs in the cache memory 330, the cache controller 320 controls the data or the code cached in the cache memory 330 to be transmitted or received. In contrast, when the cache miss occurs in the cache memory 330, the cache controller 320 reads the data or the code at a proper position in the various memories, stores the read data or code in the cache memory 330, and informs the main processor 300 of the storage. Further, in a cache access from each memory or to each memory, the cache controller 320 performs a bus arbitration function for preventing a bus collision which may occur when the coprocessor 310 simultaneously accesses buses to the memories.

The memories may include a first flash memory 410, a second flash memory 420, and a Random Access Memory (RAM) 430.

The first flash memory 410 is connected the second data bus DB2 and is a memory for storing a code or font data which can be operated by the main processor 300 and the coprocessor 310. Accordingly, the first flash memory 410 may be a memory having a first area for storing a boot and loader program, and main operation programs of the main processor 300 and a second area for storing a boot and loader program, and main operation programs of the coprocessor 310. The first flash memory 410 may comprise a single memory and is a memory for storing the programs of the main processor 300 and the coprocessor 310 in the memory areas divided as described above.

The second flash memory 420 is connected to the second data bus DB2 and is a memory for storing contents or data required to be stored during operations of the main processor 300 and the coprocessor 310. Further, the second flash memory 420 is a memory having a first area for storing data, such as contents data, font data, bit map data, or phonebook data of the main processor 300, which require non-volatility and a second area for storing data, such as contents data according to the function of the coprocessor 310, which require non-volatility. Furthermore, the second flash memory 420 may comprise a single memory and is a memory for storing the non-volatile data of the main processor 300 and the coprocessor 310 in the memory areas divided as described above.

The RAM 430 is connected to the second data bus DB2 and may be used as a work memory for the main processor 300 and the coprocessor 310. Further, the RAM 430 is a memory having a first area and a second area. Herein, the first area is used as a storage area for temporarily storing data occurring during an operation of the main processor 300 and a portion of a code which must be executed in a RAM area is loaded in the first area. Further, the second area is used as a storage area for temporarily storing data occurring during an operation of the coprocessor 310 and a portion of the code which must be executed in the RAM area is loaded in the second area.

The additional peripheral device 390 represents devices operating under the control of the main processor 300 and may include a keypad, a display unit, a wireless communication unit, a communication unit, and so on.

When the coprocessor 310 is a processor for exclusively performing image processing, a display unit 440 displays an image signal processed under the control of the coprocessor 310. Herein, when only one display unit 440 exists in the wireless terminal, the display unit 440 may become a peripheral device accessed by the main processor 300 and the coprocessor 310. An additional peripheral device 450 represents devices operating under the control of the coprocessor 310. Herein, when the wireless terminal is a camcorder, the additional peripheral device 450 may include a MultiMedia Card (MMC) I/F module, a camera, and so on. Further, when the wireless terminal is a Personal Digital Assistant (PDA) terminal, the additional peripheral device 450 may include all applications except for a communication function.

Referring to FIG. 2, the coprocessor 310, the cache controller 320, and the cache memory 330 are constructed to be disposed on a memory map of the main processor 300. That is, the coprocessor 310 is constructed to operate in the same manner as the memories 410 to 430 by the main processor 300. In other words, the main processor 300 operates the coprocessor 310 as a register module disposed on the memory map. The main processor 300 sends various commands for controlling the coprocessor 310 and various data according to the commands through the register module, and receives a response for the transmission of the commands and the data. Each module is selected by an address and a control signal and transmits or inputs valid data loaded in a data bus in a state in which the module is selected.

Meanwhile, the cache memory 330 is constructed to cache both data and a code. The cache controller 320 determines whether or not a cache hit/miss occurs in the cache memory 330. Herein, when the cache hit occurs in the cache memory 330, the cache controller 320 controls the data or the code stored in the cache memory 330 to be transmitted or received. In contrast, when the cache miss occurs in the cache memory 330, the cache controller 320 reads the data or the code at a proper position of the memory 410, 420, or 430, stores the read data or code in the cache memory 330, and controls the main processor 300 to both read the stored data or code and write the stored data or code. Further, for a cache access from each of the memories 410 to 430 or to each of the memories 410 to 430, the cache controller 320 performs a bus arbitration function for preventing a bus collision which may occur when the coprocessor 310 simultaneously accesses buses to the memories 410 to 430.

Hereinafter, an operation of the wireless terminal having the aforementioned construction according to the first embodiment of the present invention will be described. First, the main processor 300 can perform an access operation, such as a reading operation or a writing operation, with respect to the first area of each of the memories 410 to 430. Herein, when the main processor 300 accesses the first areas of the RAM 430, the first flash memory 410, and the second flash memory 420 in the memory map, the cache controller 320, which observes the state of a system bus between the main processor 300 and the coprocessor 310, checks whether or not the cache hit or the cache miss occurs. Herein, when the cache hit occurs, the cache controller 320 allows the main processor 300 to read information stored in the cache memory 330 or to store information in the cache memory 330. In contrast, when the cache miss occurs, in order to prevent a collision from occurring in a bus between the coprocessor 310 and the cache memory 330, the cache controller 320 stops a memory access operation of the coprocessor 310. In a state in which the bus control of the coprocessor 310 is interrupted in this manner, the cache controller 320 accesses the memories 410 to 430. That is, the cache controller 320 reads data or codes of the memories 410 to 430 to store the read data or codes in the cache memory 330, and the main processor 300 reads the data or codes stored in the cache memory 330. Herein, when the main processor 300 does not access the cache memory 330, the cache controller 320 permits the coprocessor 310 to access the cache memory 330.

Figure 3:
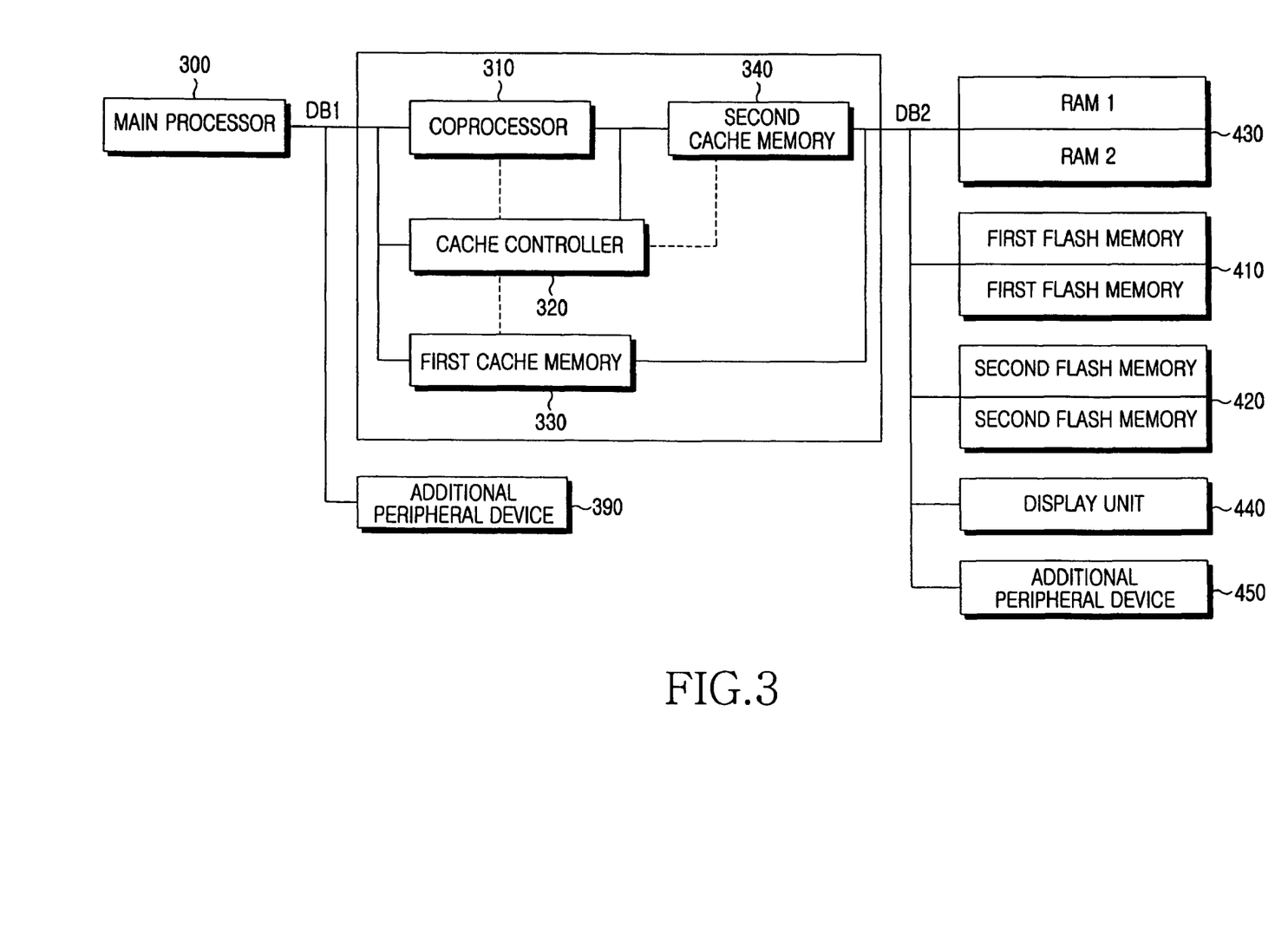
FIG. 3 is a block diagram illustrating a construction of a wireless terminal having a coprocessor according to a second embodiment of the present invention.

FIG. 3 is a block diagram illustrating a construction of a wireless terminal having a coprocessor according to a second embodiment of the present invention.

Referring to FIG. 3, a main processor 300 is connected to a first data bus DB1 and controls the communication and the general operation of the wireless terminal. The coprocessor 310 and a peripheral device 390 for performing a communication function in the wireless terminal are connected to the first data bus DB1. Herein, the main processor 300 may be an MSM. The coprocessor 310 is connected between the first data bus DB1 and a second data bus DB2 and exclusively processes a specific function under the control of the main processor 300. Herein, the specific function may be a multimedia data processing function and the multimedia data may be image data photographed by a camera, image data received in a TV receiver, an MP3 audio data, and so on.

In FIG. 3, a first flash memory 410, a second flash memory 420, and a RAM 430 are connected in parallel to the second data bus DB2, have the same construction and operation as those of the memories in FIG. 2, respectively.

A first cache memory 330 is connected between the first data bus DB1 and the second data bus DB2 and caches both data and codes stored in first areas of the memories 410 to 430. A second cache memory 340 is connected between the coprocessor 310 and the second data bus DB2 and caches both data and codes stored in second areas of the memories 410 to 430.

A cache controller 320 is connected between the first data bus DB1 and the coprocessor 310 and checks whether or not a cache hit/miss occurs in the first cache memory 330 or the second cache memory 340. Further, when the cache hit occurs, the cache controller 320 controls the data or the code, which have been cached in the first cache memory 330 or the second cache memory 340, to be transmitted to or received in the main processor 300 or the coprocessor 310. In contrast, when the cache miss occurs, the cache controller 320 reads the data or the code at a proper position of the memories 410 to 430, stores the read data or code in the cache memory 330 or the second cache memory 340, and informs the main processor 300 or the coprocessor 310 of the storage. Further, in a cache access from each of the memories 410 to 430 or to each of the memories 410 to 430, the cache controller 320 performs a bus arbitration function for preventing a bus collision which may occur when the main processor 300 and the coprocessor 310 simultaneously access buses to the memories 410 to 430.

Referring to FIG. 3, when it is compared with the system of FIG. 2, the system of FIG. 3 further includes the second cache memory 340. Accordingly, the system of FIG. 3 has a changed cache control method of the cache controller 320. That is, when the coprocessor 310 accesses the second areas of the memories 410 to 430, the second cache memory 340 reduces an access frequency of the memories 410 to 430. Further, the second cache memory 340 prevents a bus collision which may occur when the coprocessor 310 tries to access the memories 410 to 430 by the cache controller 320. That is, in the system having the structure as shown in FIG. 2, the cache controller 320 controls the coprocessor 310 not to access the memories 410 to 430. However, in the system having the structure as shown in FIG. 3, the cache controller 320 controls the second cache memory 340 to obtain the same result.

Hereinafter, an operation of the wireless terminal having the structure as shown in FIG. 3 according to the second embodiment of the present invention will be described. First, when the main processor 300 performs an access operation (e.g., a reading operation or a writing operation) of data and a code with respect to the first area of each of the memories 410 to 430, that is, the main processor 300 accesses the first area of each of the memories 410 to 430 disposed on a memory map, the cache controller 320, which monitors the state of a system bus between the main processor 300 and the coprocessor 310, checks whether or not the cache hit or the cache miss occurs in the first cache memory 330. Herein, when the cache hit occurs in the first cache memory 330, the cache controller 320 allows the main processor 300 to read or write data and a code of the cache memory 330. In contrast, when the cache miss occurs in the first cache memory 330, the cache controller 320 takes an action for preventing a collision from occurring in a bus between the coprocessor 310 and the memories 410 to 430, and controls the coprocessor 310 to access the memories 410 to 430.

The action for preventing the bus collision changes according to whether or not the cache miss occurs in the second cache memory 340 when the coprocessor 310 accesses the second cache memory 340. When the cache hit occurs in the second cache memory 340, the bus collision does not occur because the coprocessor 310 does not access the memories 410 to 430. Accordingly, the cache controller 320 observes a bus between the coprocessor 310 and the second cache memory 340 and allows the coprocessor 310 to access the second cache memory 340 when the cache hit occurs in the second cache memory 340. In contrast, when the cache miss occurs in the second cache memory 340, the cache controller 320 controls the coprocessor 310 and the second cache memory 340 not to access the memories 410 to 430 and controls the main processor 300 or the first cache memory 330 to access the memories 410 to 430, in order to prevent the bus collision. Herein, the cache controller 320 allows the coprocessor 310 and the second cache memory 340 to access the memories 410 to 430 when the main processor 300 or the first cache memory 330 ends or stops an access with respect to the memories 410 to 430.

As described above, in a wireless terminal having a coprocessor according to a the present invention, a main processor and the coprocessor each do not include a RAM, an NOR-type flash memory, and an NAND-type flash memory and can share the RAM, the NOR-type flash memory, and the NAND-type flash memory, so that the miniaturization, low power, and low cost of a terminal can be achieved.

While the invention has been shown and described with reference to certain embodiments thereof, it should be understood by those skilled in the art that various changes in form and details may be made therein without departing from the spirit and scope of the invention as defined by the appended claims.

What is claimed is:

1. A terminal apparatus including a main processor and a coprocessor, the main processor connected to a first data bus to control a communication function for a wireless terminal, and the coprocessor connected between the first data bus and a second data bus to perform a multimedia function for the wireless terminal under a control of the main processor, the terminal apparatus comprising:
   a first flash memory connected to the second data bus and having a first area storing operation programs of the main processor and a second area storing operation programs of the coprocessor;
   a second flash memory connected to the second data bus and having a first area storing data requiring non-volatility of the main processor, and a second area storing data requiring non-volatility of the coprocessor;
   a random access memory connected to the second data bus, the random access memory having a first area temporarily storing data occurring during an operation of the main processor and allowing a portion of a code which is executed in a random access memory area to be loaded in the first area of the random access memory, and having a second area temporarily storing data occurring during an operation of the coprocessor and allowing a portion of the code which is executed in the random access memory area to be loaded in the second area of the random access memory;
   a cache memory connected between the first data bus and the second data bus, the cache memory caching the data and the codes of the first areas of the random access memory and the flash memories; and
   a cache controller connected to the first data bus, the cache controller determining whether or not a cache hit or a cache miss occurs in the cache memory, controlling the main processor to access the cached data or codes when the cache hit occurs in the cache memory, and accessing at least one of the flash memories and the random access memory to store the data or the codes in the cache memory and controlling the main processor to access the cache memory when the cache miss occurs in the cache memory.

2. The terminal apparatus as claimed in claim 1, wherein, when the cache miss occurs in the cache memory, the cache controller stops the coprocessor from accessing at least one of the flash memories and the random access memory, thereby arbitrating a bus.

3. The terminal apparatus as claimed in claim 2, wherein the cache controller controls the coprocessor to access at least one of the flash memories and the random access memory when the main processor does not access at least one of the flash memories and the random access memory.

4. A terminal apparatus including a main processor and a coprocessor, the main processor connected to a first data bus to control a communication function of a wireless terminal, and the coprocessor connected between the first data bus and a second data bus to perform a multimedia function of the wireless terminal under a control of the main processor, the terminal apparatus comprising:
   a first flash memory connected to the second data bus, the first flash memory having a first area storing operation programs of the main processor and having a second area storing operation programs of the coprocessor;
   a second flash memory connected to the second data bus, the second flash memory having a first area storing data of the main processor, which requires non-volatility, and having a second area storing data of the coprocessor, which requires non-volatility;
   a random access memory connected to the first data bus, the random access memory having a first area temporarily storing data occurring during an operation of the main processor and allowing a portion of a code which is executed in a random access memory area to be loaded in the first area of the random access memory, and having a second area temporarily storing data occurring during an operation of the coprocessor and allowing a portion of the code which is executed in the random access memory area to be loaded in the second area of the random access memory;
   a first cache memory connected between the first data bus and the second data bus, the first cache memory caching the data and the codes of the first areas of the flash memories and the random access memory;
   a second cache memory connected between the coprocessor and the second data bus, the second cache memory caching the data and the codes of the second areas of the flash memories and the random access memory; and
   a cache controller connected to the first data bus, the cache controller determining whether or not a cache hit or a cache miss occurs in the first cache memory or the second cache memory, controlling the main processor to access the cached data or codes when the cache hit occurs in the first cache memory, controlling the coprocessor to access the cached data or codes when the cache miss occurs in the first cache memory and the cache hit occurs in the second cache memory, and accessing at least one of the flash memories and the random access memory to control the data or the codes to be stored in the first cache memory or the second cache memory when the cache miss occurs in the first cache memory and the second cache memory.

5. The terminal apparatus as claimed in claim 4, wherein the cache controller stores the data or the codes of the first areas of at least one of the flash memories and the random access memory in the first cache memory while stopping the coprocessor from accessing at least one of the flash memories and the random access memory to prevent a bus collision when the cache miss occurs in the first cache memory and the second cache memory, and the cache controller stores the data or the codes of the second areas of at least one of the flash memories and the random access memory in the second cache memory when there are no data or codes to be stored in the first cache memory.

6. A memory control method for controlling access to data buses connecting memories comprising a first flash memory, a second flash memory, a cache memory and a random access memory of a wireless terminal by a main processor and a coprocessor, the main processor connected to a first data bus, the coprocessor connected between the first data bus and a second data bus, the first flash memory connected to the second data bus, the first flash memory having a first area storing operation programs of the main processor and a second area storing operation programs of the coprocessor, the second flash memory connected to the second data bus, the second flash memory having a first area storing data requiring non-volatility of the main processor and a second area storing data requiring non-volatility of the coprocessor, the random access memory connected to the second data bus, the cache memory connected between the first data bus and the second data bus, the random access memory having a first area temporarily storing data occurring during an operation of the main processor and allowing a portion of a code which is executed in a random access memory area to be loaded in the first area of the random accessory memory, the random access memory having a second area temporarily storing data occurring during an operation of the coprocessor and allowing a portion of the code which is executed in the random access memory area to be loaded in the second area of the random access memory, the cache memory caching the data and codes of the first areas of the flash memories and the random access memory, the method comprising the steps of:

determining whether or not a cache hit or a cache miss occurs in the cache memory;

controlling the main processor to access cached data or codes when the cache hit occurs in the cache memory;

accessing at least one of the flash memories and the random access memory to store data or codes in the cache memory and controlling the main processor to access the cache memory, when the cache miss occurs in the cache memory; and     controlling the coprocessor to access at least one of the flash memories and the random access memory when the main processor does not access at least one of the flash memories and the random access memory in a state in which the cache miss occurs in the cache memory.

7. The method of claim 6, wherein:

the main processor controls a communication function of the wireless terminal; and the coprocessor performs a multimedia function for the wireless terminal under a control of the main processor.

8. A memory control method for controlling access to data buses connecting memories comprising a first flash memory, a second flash memory, a first cache memory, a second cache memory and a random access memory of a wireless terminal by a main processor and a coprocessor, the main processor being connected to a first data bus, the coprocessor being connected between the first data bus and a second data bus, the first flash memory being connected to the second data bus, the first flash memory having a first area storing operation programs of the main processor and having a second area storing operation programs of the coprocessor, the second flash memory being connected to the second data bus, the second flash memory having a first area storing data of the main processor requiring non-volatility and having a second area storing data of the coprocessor requiring non-volatility, the random access memory being connected to the second data bus, the random access memory having a first area temporarily storing data occurring during an operation of the main processor and allowing a portion of a code which is executed in a random access memory area to be loaded in the first area of the random access memory, the random access memory having a second area temporarily storing data occurring during an operation of the coprocessor and allowing a portion of the code which is executed in the random access memory area to be loaded in the second area of the random access memory, the first cache memory being connected between the first data bus and the second data bus, the first cache memory caching the data and the codes of the first areas of the flash memories and the random access memory, and the second cache memory being connected between the coprocessor and the second data bus, the second cache memory caching the data and the codes of the second areas of the flash memories and the random access memory, the method comprising the steps of:

determining whether or not a cache hit or a cache miss occurs in the first cache memory or the second cache memory;

controlling the main processor to access the cached data or codes when the cache hit occurs in the first cache memory;

controlling the coprocessor to access the cached data or codes when the cache miss occurs in the first cache memory and the cache hit occurs in the second cache memory; and     accessing at least one of the flash memories and the random access memory to control the data or the codes to be stored in the first cache memory or the second cache memory when the cache miss occurs in the first cache memory and the second cache memory.

9. The method of claim 8, wherein:

the main processor controls a communication function of the wireless terminal; and the coprocessor performs a multimedia function for the wireless terminal under a control of the main processor.

10. The method as claimed in claim 8, the method further comprising:

storing the data or the codes of the first areas of at least one of the flash memories and the random access memory in the first cache memory while stopping the coprocessor from accessing at least one of the flash memories and the random access memory to prevent a bus collision when the cache miss occurs in the first cache memory and the second cache memory; and     storing the data or the codes of the second areas of at least one of the flash memories and the random access memory in the second cache memory when there are no data or codes to be stored in the first cache memory.

\* \* \* \* \*